(12) United States Patent
King

(10) Patent No.: US 10,900,220 B2
(45) Date of Patent: Jan. 26, 2021

(54) CONCRETE WELDMENT

(71) Applicant: Ming-Ta King, Chicago, IL (US)

(72) Inventor: Ming-Ta King, Chicago, IL (US)

( * ) Notice: Subject to any disclaimer, the term of this patent is extended or adjusted under 35 U.S.C. 154(b) by 225 days.

(21) Appl. No.: 16/016,108

(22) Filed: Jun. 22, 2018

(65) Prior Publication Data
US 2018/0328023 A1 Nov. 15, 2018

Related U.S. Application Data

(62) Division of application No. 15/137,551, filed on Apr. 25, 2016, now Pat. No. 10,047,515.

(51) Int. Cl.
| | | |
|---|---|---|
| *E04B 1/41* | (2006.01) | |
| *E04B 5/02* | (2006.01) | |
| *E04C 2/04* | (2006.01) | |
| *B23K 31/00* | (2006.01) | |
| *E04C 5/16* | (2006.01) | |
| *E04C 2/38* | (2006.01) | |
| *E04B 1/19* | (2006.01) | |

(52) U.S. Cl.
CPC .................. *E04B 1/41* (2013.01); *E04B 1/19* (2013.01); *E04B 5/023* (2013.01); *E04C 2/044* (2013.01); *E04C 2/38* (2013.01); *E04C 5/16* (2013.01); *B23K 31/00* (2013.01); *E04B 2001/1972* (2013.01)

(58) Field of Classification Search
None
See application file for complete search history.

(56) References Cited

U.S. PATENT DOCUMENTS

| | | | | | |
|---|---|---|---|---|---|
| 1,280,485 | A | * | 10/1918 | Kahn | E04B 1/4107 52/710 |
| 3,958,954 | A | * | 5/1976 | Ehlenbeck | E04B 1/215 428/584 |
| 4,724,649 | A | * | 2/1988 | Lowndes, III | E04B 1/215 52/583.1 |
| 4,930,677 | A | * | 6/1990 | Jolliffee | E04B 1/6807 228/120 |
| 5,402,616 | A | * | 4/1995 | Klein | B28B 23/0056 52/578 |
| 5,890,340 | A | * | 4/1999 | Kafarowski | E04B 1/4128 52/100 |
| 6,185,897 | B1 | * | 2/2001 | Johnson | E04B 1/41 52/582.1 |
| 7,461,492 | B1 | * | 12/2008 | Francies, III | E04B 1/483 52/125.4 |
| 8,468,766 | B1 | * | 6/2013 | Keenan | E04B 5/023 52/583.1 |
| 9,359,757 | B1 | * | 6/2016 | King | E04C 2/044 |

(Continued)

*Primary Examiner* — Devang R Patel
(74) *Attorney, Agent, or Firm* — Knechtel, Demeur & Samlan

(57) ABSTRACT

A weldment that is embedded in a precast concrete building member that is used to join the concrete building member to other concrete building members. The weldment has a top plate, side plate, and outstanding top and bottom legs. The surface of the top plate and side plate are not embedded in the precast concrete building member. The legs are integrally formed with the top plate and side plate. The top plate and side plate present weldable surfaces to join by welding the precast concrete building member to another building member.

7 Claims, 5 Drawing Sheets

(56) References Cited

U.S. PATENT DOCUMENTS

| | | | |
|---|---|---|---|
| 2003/0101678 A1* | 6/2003 | Snauwaert | E01C 5/08 |
| | | | 52/712 |
| 2003/0140590 A1* | 7/2003 | Lancelot, III | E01D 19/00 |
| | | | 52/712 |
| 2012/0167517 A1* | 7/2012 | Ruiz | E04B 1/41 |
| | | | 52/582.1 |
| 2012/0192506 A1* | 8/2012 | King | B28B 23/0056 |
| | | | 52/125.4 |

* cited by examiner

CONCRETE WELDMENT

CROSS-REFERENCE TO RELATED APPLICATIONS

This application is a divisional application based on and claims priority of patent application Ser. No. 15/137,551 filed Apr. 25, 2016, currently pending.

FIELD OF THE INVENTION

This invention relates to a metal weldable piece that is embedded into a precast concrete member which is used as a building component, the method of manufacturing the precast member so that the weldable piece is properly positioned in the member and the method of connecting the precast concrete slab to an adjacent member and the method of manufacturing the metal weldable piece. The weldable piece is used to join adjacent concrete structures or members by welding together the weldable piece embedded in each of the concrete structures.

More specifically, the invention is directed to:
(1) Connecting precast concrete floor or roof members (i.e. beams, slabs, joists or "T" sections) to their supporting members (i.e. beams, columns or walls) and connecting wall panels to the supporting cast in place concrete footings.
(2) Automatic stamping the metal plate and bending the plate to a shape which will optimize its capacity to support the required vertical and horizontal shear forces as well as the pull out tensile forces.
(3) The manufacturing process of automatic stamping of the weldment while minimizing or eliminating waste material to provide the most economical manufacturing of the product.
(4) A central horizontal flat plate to provide an easier orientation for field welding.

BACKGROUND OF THE INVENTION

Precast concrete members are widely used throughout the building industry in large concrete structures such as parking garages, office buildings, stadiums, and warehouses. The precast members are manufactured in a facility and then shipped to the job site and erected to form the desired structure. In general, precast concrete members include floor slab (double tee and others), beam (girder), column, wall panel, etc.

In general, the precast concrete slabs are supported by concrete beams and the precast concrete beams are supported by precast concrete columns or wall panels and those vertical members are supported by the cast in place concrete foundations. All these members may have to be connected together to avoid possible relative movement to one another due to applied loads such as live loads, dead loads, wind load and etc. Connectors are commonly used which are cast into the precast concrete members and field welded together to provide the stability of the structure, The connectors are subjected to a variety of forces acting on the welded connection formed between opposing connectors. Lateral wind and earthquake loads applied to the building structure may impart horizontal shear forces in the plane of the floor as well as tension forces that have a tendency to pull adjacent structural members apart. Horizontal shear forces may also result from a volume change in the precast members, particularly due to temperature change, as well as shrinkage and creep effects. Vertical shear forces may be imparted on the welded connection in response to loads acting on the load bearing surfaces of the concrete members, temperature variations and other factors as well.

In order to prevent or minimize the relative movement and to increase the strength of the final structure, metal inserts, often called "weldments" are placed at the edges of supporting members and the ends of the members which is being supported. When the members are positioned for final assembly, the metal weldment of one member is aligned with and opposite to a complementary metal weldment in the supporting member (see FIGS. 7 and 8). The complementary metal weldments are welded to each other to join the two weldments. This results in a unitary structure that is much stronger and less prone to movement than if no means of joining the members were used. While designing the connection and the weldment, the following aspects are considered:
(A) horizontal shear capacity;
(B) tensile capacity;
(C) vertical shear force;
(D) ease of placement or fastening of weldment during production;
(E) ease of placement of the loose welding steel and ease of welding; and
(F) overall material and labor cost.

In the past, the precast member connector has been comprised of one flat steel plate for a field welding surface with multitude rebar welded to the bottom of the plate to resist the horizontal tensile forces along with vertical reinforcing bars or studs welded to the plate for resisting vertical forces. By preparing multiple types of material and welding them together, the material cost as well as the labor cost is very high and adds substantial cost to construction. More importantly, the effect of quality due to human error is very worrisome.

Accordingly, there is a need for a connector which is totally machine made by using a new stamping technique to guarantee the quality and reduce its cost and forms a reliable connection between precast concrete members in the presences of variety of loads.

SUMMARY OF THE INVENTION

Applicant's invention provides a weldment that comprises a top plate and side plate integrally formed and at 90° to each other. There are a pair of legs, identifies identified as a top leg and bottom leg. The top leg is integrally formed with the top plate and the bottom leg is integrally formed with the side plate. The top plate and side plates have a generally planar face suitable for welding. The side plate is flat and perpendicular with respect to the end of the concrete member which provides an easily accessible weldable surface. The top leg is at approximately 30° with respect to the welding surface of the top plate with a 90° bend at the end of the leg and saw tooth at their edges that provide pull out tensile capacity of the weldment. The bottom leg is at approximately 60° with respect to the side plate with a 90° bend at the tip of the bottom leg and saw tooth at their edges that provide vertical shear capacity of the weldment. In addition, the side plate includes a threaded aperture that extends centrally through the side plate that is adapted to receive a threaded screw for securing the connector to a conventional form used to cast the precast concrete members. The weldment is cast in the precast concrete building member.

The method of manufacturing the weldment uses a steel blank from which two different types of weldments are formed with each of the weldments functioning in the same manner when embedded in the precast structural member. This method of manufacturing provides for minimal or no waste of material in the manufacturing process. The result is that manufacturing costs are greatly reduced and the efficiency has been increased.

DETAILED DESCRIPTION OF THE PREFERRED EMBODIMENT

Figure 1:
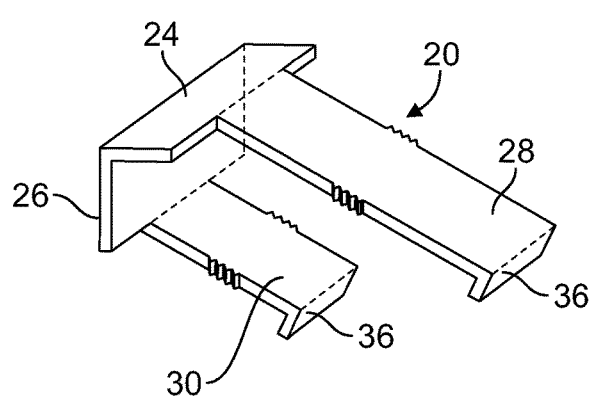
FIG. 1 is a perspective view of the first embodiment of the weldment.
Figure 2:
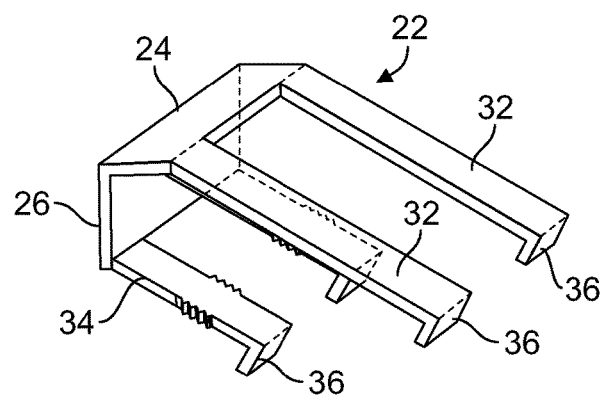
FIG. 2 is a perspective view of the second embodiment of the weldment.
Figure 3:
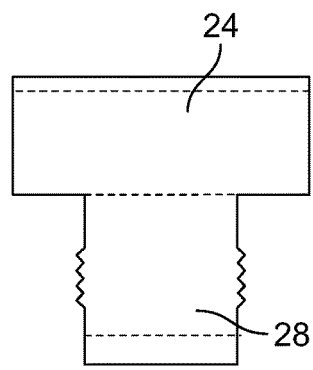
FIG. 3 is a front elevation view of the first embodiment of the weldment.
Figure 4:
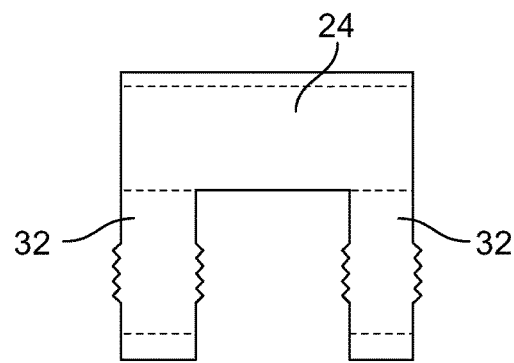
FIG. 4 is a front elevation view of the second embodiment of the weldment.
Figure 5:
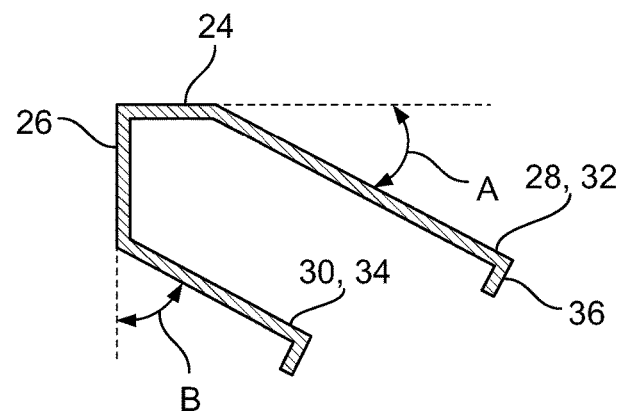
FIG. 5 is a right side elevation view of the first and second embodiments of the weldment.
Figure 6:
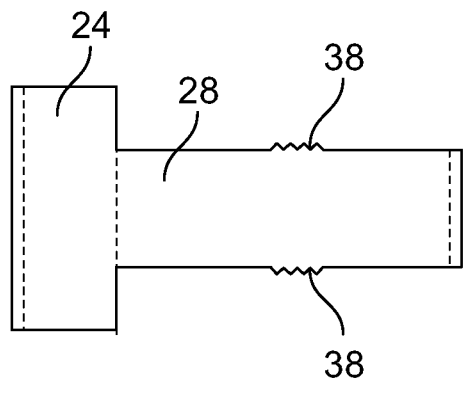
FIG. 6 is top plan view of the first embodiment of the weldment.
Figure 7:
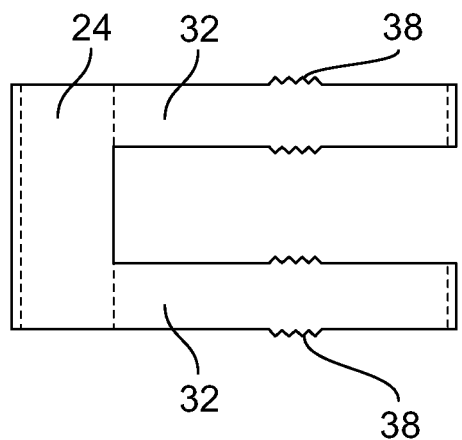
FIG. 7 is top plan view of the second embodiment of the weldment.

Referring to FIG. 1 a first embodiment of a weldment or connector 20 is illustrated. FIG. 2 illustrates a second embodiment of a weldment 22 that functions substantially identically to the first embodiment. For simplicity where applicable, the same reference numbers will be used for common components of the weldments 20, 22. The weldments 20, 22 are manufactured from a one-piece steel plate member made of metal, such as stainless steel or carbon steel. The weldment 20, 22 includes a top plate 24 and a side plate 26 having a generally planar surface suitable for welding. The weldment 22 has a pair of legs being a top leg 28 and a bottom leg 30. The weldment 22 has two top legs 32 and two bottom legs 34. The top legs 28, 32 are bent down at an angle "A" approximately 30° from the horizontal surface of top plate 24 and the bottom legs 30, 34 are bent upward approximately 60° at an angle "B" from the vertical surface of side plate 26 (See FIG. 5). The legs 28, 30 32 and 34 all terminate in bent tips 36 that are at an angle of approximately 90° from the surface of their respective legs. The sides of the legs 28, 30, 32 and 34 are provided with a saw tooth surface 38 that is approximately one-quarter inch deep at the middle of all of the legs. The bent tips 36 and saw tooth surface 38 increase the tensile capacity of the weldments 20, 22 and the holding force (the force necessary to pull the weldment out from the concrete member) of the weldments 20, 22.

Figure 13:
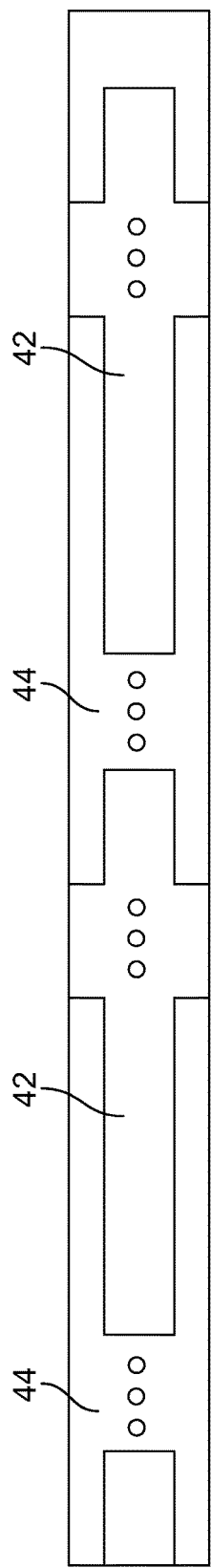
FIG. 13 illustrates the stamping process for manufacturing the metal weldment.
Figure 14:
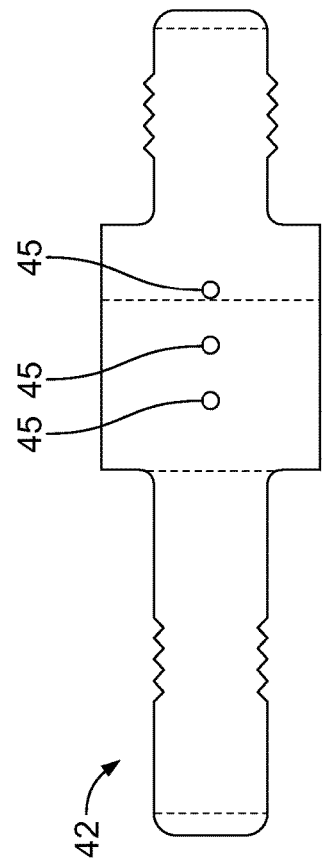
FIG. 14 is a top plan view of the weldment illustrated in FIG. 1 formed from the stamping process.
Figure 15:
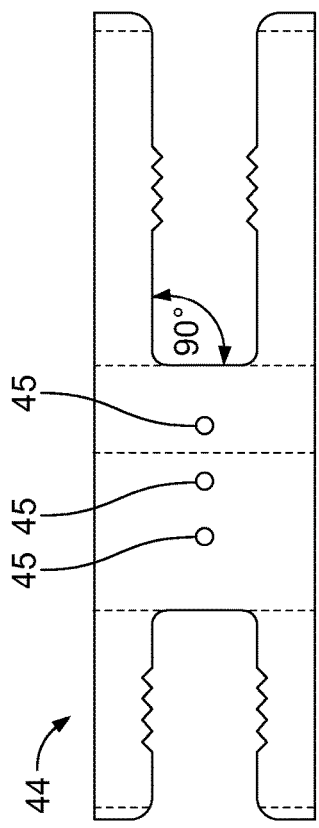
FIG. 15 is a top plan view of the weldment illustrated in FIG. 2 formed from the stamping process.

The method of manufacturing the weldments 20, 22 is illustrated in FIGS. 13-15. Referring to FIG. 13, a five-inch wide steel plate 40 is machine cut or stamped to the shapes as shown. This creates two blanks 42, 44 as seen in FIGS. 14 and 15. Holes 45 are punched or drilled as shown. The blank 42 is bent along fold lines 44, 46, 48 and 50 to the shape as shown in FIG. 1. The blank 44 is folded along fold lines 54, 56, 58 and 60 to the shape as shown in FIG. 2. The method of stamping the two different blanks 42, 44, which as can be seen are complementary to each other, is to minimize, and in this case to almost eliminate the material waste and to provide manufacturing efficiency. The only waste in this case is the removal of the holes 45. These two weldments 20 and 22 are designed such that they have the exact same strength and load bearing capacity.

Figure 12:
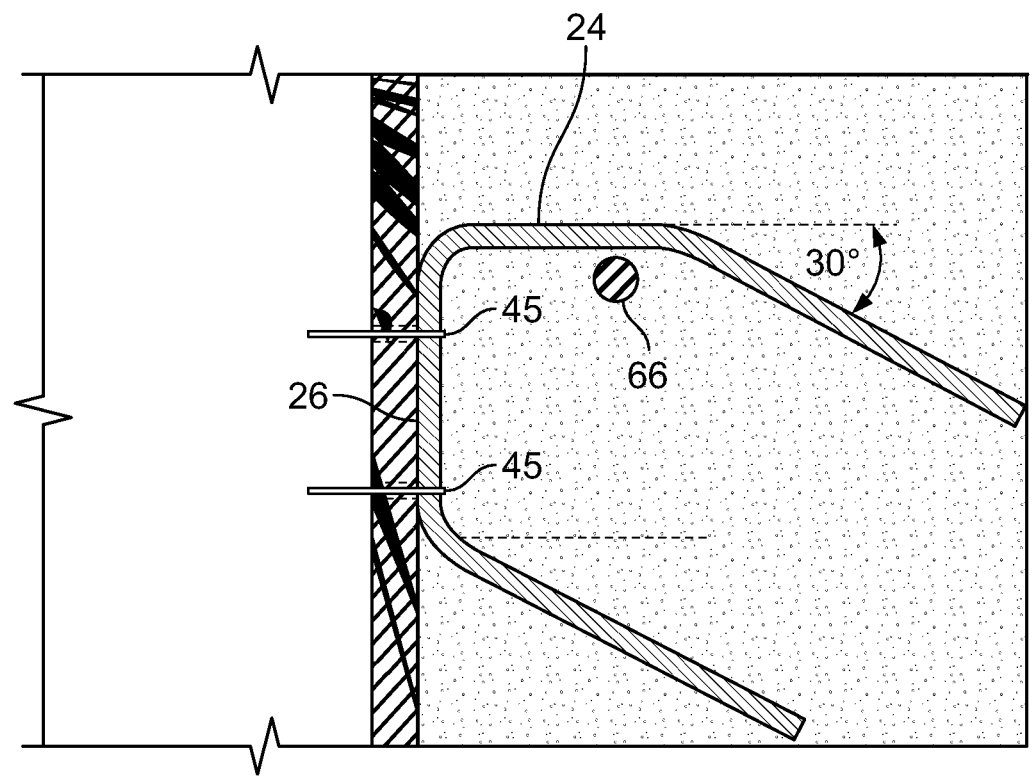
FIG. 12 is a cross section view of the mold used for forming the concrete members with the weldment and slab reinforcement placed in the mold.

As seen in FIG. 12, the weldment 20, 22 has in the side plate 26 has a hole 45, that is preferably threaded. The weldment 20, 22 is placed in the form used to manufacture the precast concrete member. The weldment 22, 24 is positioned with the side plate 26 against a side form 62 in the mold and pins or screws 64 are passed through the side form 62 and into the holes 45. This keeps the weldment 20, 22 in proper place in the mold while the concrete is poured into the mold. Wire strand or reinforcing bars 66 may be placed through the weldment 22, 24 for added strength to the finished concrete member.

Figure 8:
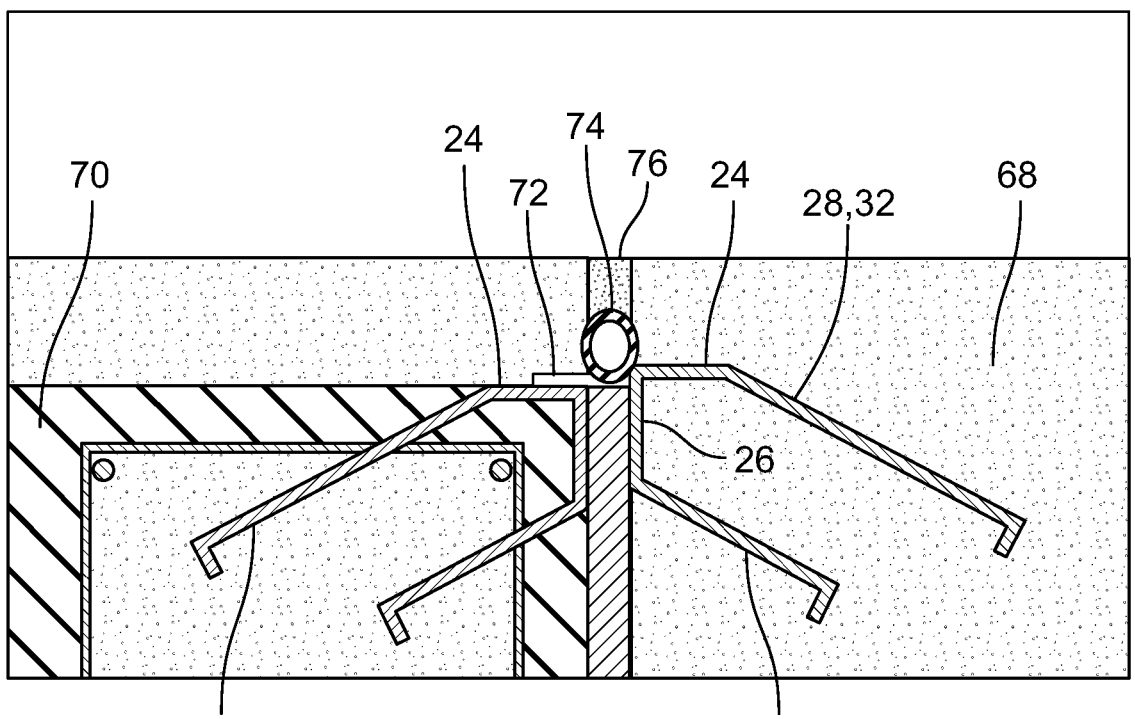
FIG. 8 is a cross section view with portions removed of a floor or roof member connected to a supporting beam illustrating the position of the weldments in each member with respect to each other.

Several examples of connecting the precast concrete members are illustrated in FIGS. 8-11. In FIG. 8 one weldment 20 or 22 is embedded in a precast t member 68. The side plate 26 has an exposed outside surface extending out from the edge of the precast t member 68. There is a beam 70 adjacent to the precast t member 68. At the top of the beam 70 is a weldment 20 or 22 that has the top plate 24 extending out from the top of the beam 70 such that the top surface of the top plate 24 is exposed and free of concrete. A loose weld plate 72 is welded to the side plate 26 of the weldment in the t member 68 and to the top plate 24 of the weldment in the beam 70. A backup rod 74 is inserted between the t member 68 and the beam 70 with the spacing filled in the conventional manner with caulking joint 76.

Figure 9:
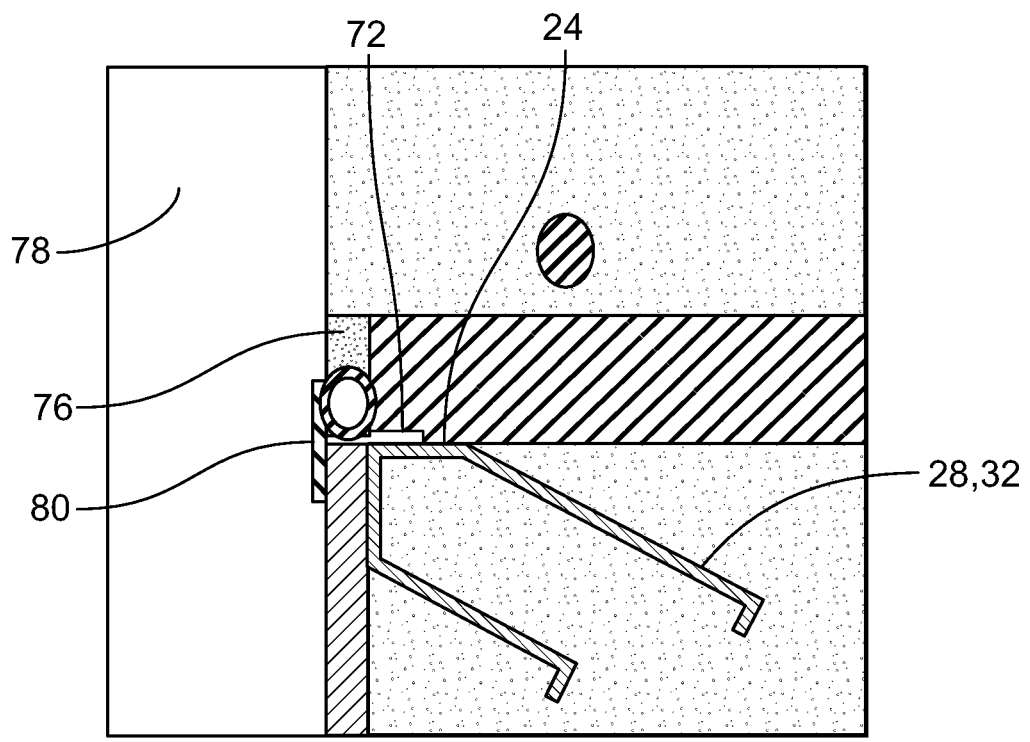
FIG. 9 is a cross section view with portions removed of precast member connected to a supporting column or wall illustrating the position of the weldments in each member with respect to each other.

FIG. 9 illustrates another embodiment in which a weldment 20 or 22 is embedded in the precast t member 68 as previously described. In this case there is column or shear wall 78 adjacent to the t member 68. There is an embedded plate 80 in the column 78. The weld plate 72 is welded to the top plate 24 of the t member 68 and is also welded to the front surface of the embedded plate 80. The backup rod 74 is inserted and the caulking joint 76 completes the installation.

Figure 10:
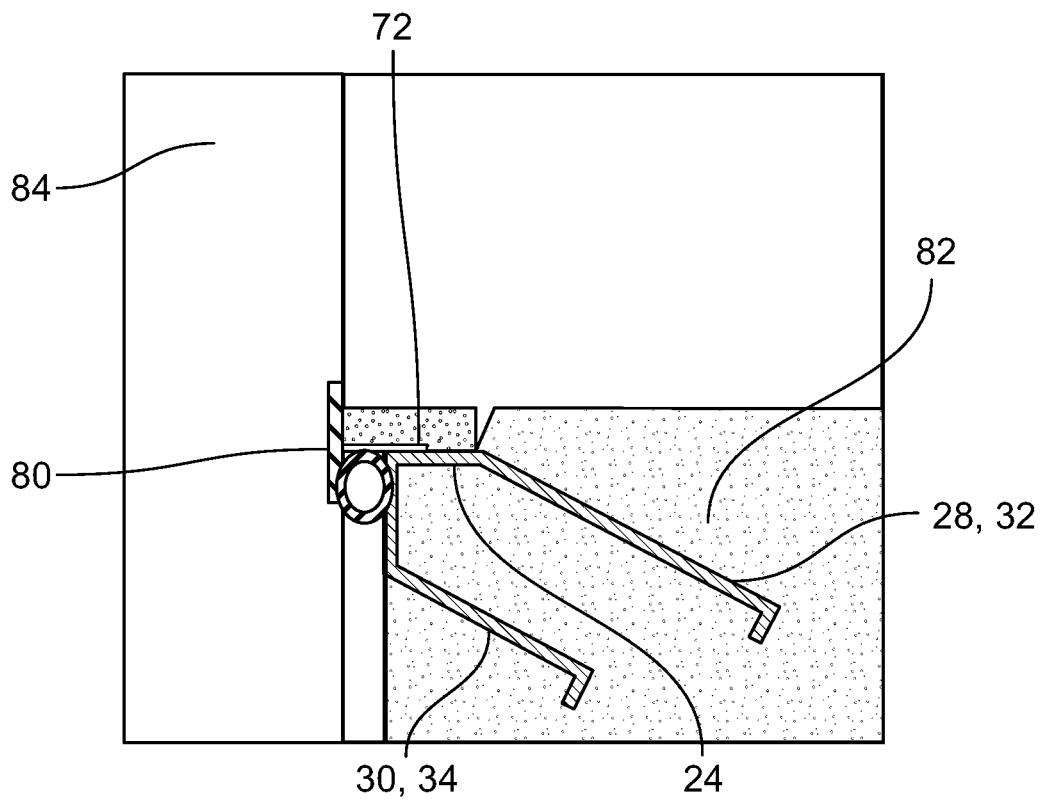
FIG. 10 is a cross section view with portions removed of another embodiment of a precast member connected to a supporting column or wall illustrating the position of the weldments in each member with respect to each other.

FIG. 10 illustrates a weldment 20 or 22 that is embedded or cast in the flange at the top of a double t member 82. Double tee members are load bearing slabs with two depending concrete joists for flexural capacity. The double tee member 82 is formed with a reinforcing mesh positioned generally in the center of the slabs that extend generally parallel to the load bearing surface of the slab. The weld plate 72 is welded to the top plate 24. The backup rod 74 is inserted between the double t member 82 and a spandrel or wall 84 to which the double t member 82 is to be fastened. The weld plate 72 is then welded to the embedded plate 80 in the spandrel or wall 84 and the caulking joint 76 is applied.

Figure 11:
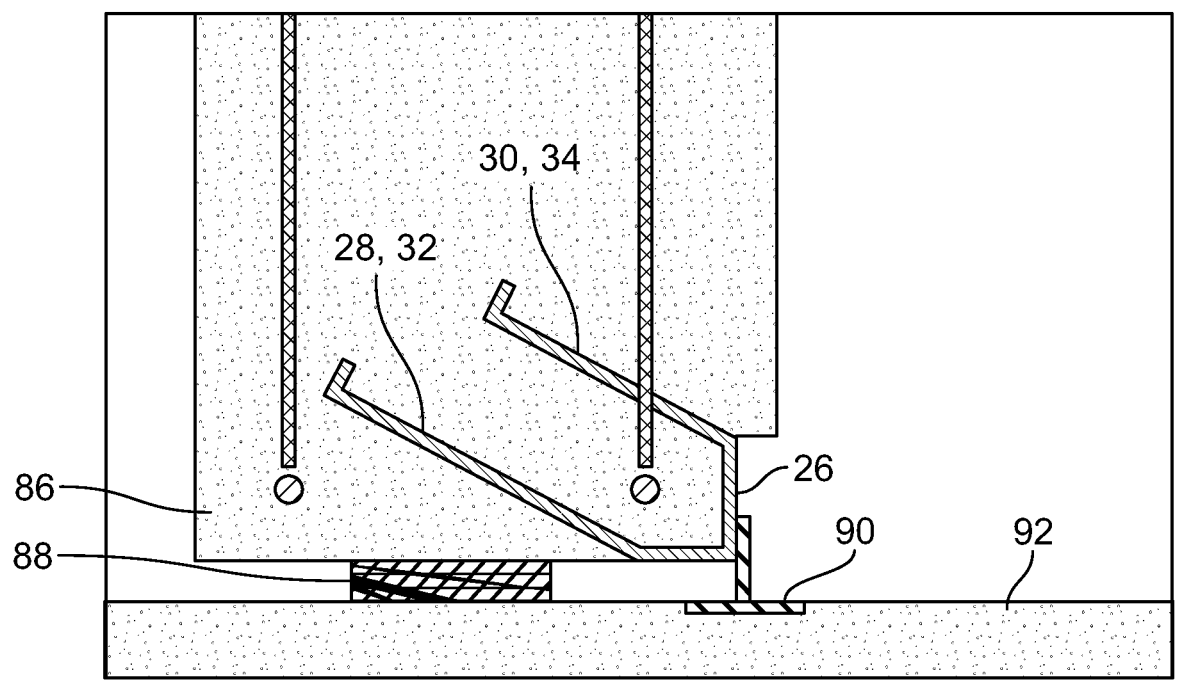
FIG. 11 is a cross section view with portions removed of a vertical wall panel connected to a cast in place footing illustrating the position of the weldment to the footing plate.

FIG. 11 illustrates another embodiment in which the weldment 20 or 22 is embedded in a precast wall panel 86. The wall panel 86 is supported on a shim stack 88. There is a footing plate 90 that is embedded in a floor or footing 92. The weldment 20 or 22 has its side plate 26 welded to the footing plate 90. The footing plate 90 can be made from a flat sheet of metal embedded in the floor or footing 92 with a vertical plate welded thereto or it can be a singular t-shaped member.

The weldments 20 and 22 provide connections in accordance with the principles of the present invention as are shown for joining adjacent precast concrete beams, slabs and supporting column. As shown in FIGS. 8-11 the weldments are embedded or cast in the slab, beam end or wall panel so that the embedded plate or weldment of adjoining column members is placed in opposing relationship for welding of the weldments or embedded plates together to join the columns, beams and slabs.

Thus there has been provided a concrete weldment and method of manufacturing the weldment that fully satisfies the objects and advantages set forth above. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A combination concrete weldment and precast concrete member comprising:
   a precast concrete member having a length, a width and a height, a front face, a top surface and a bottom surface, an edge between the top surface and the front face of the precast concrete member,
   a concrete weldment comprising a top plate having a top plate front edge and top plate rear edge, a side plate having a side plate top edge and a side plate bottom edge, the entire top plate front edge and entire side plate top edge connected at substantially 90° to each other, a first leg having a first leg proximal end and a first leg distal end, the first lea proximal end connected to the side plate bottom edge with the first leg embedded in the precast concrete member, a second leg having a second leg proximal end and a second leg distal end, the second leg proximal end directly connected to the top plate rear edge with the second leg embedded in the precast concrete member,
   the top plate having an exposed top surface which presents a weldable surface along the top surface of the precast concrete member and which is not embedded in the precast concrete member, and
   the side plate having an exposed surface which presents a weldable surface along the front face of the precast concrete member that is not embedded in the precast concrete member.

2. The combination concrete weldment and precast concrete member of claim 1 and further comprising a saw tooth cut into the first and second legs to increase the holding force of the concrete weldment within the precast concrete member.

3. The combination concrete weldment and precast concrete member of claim 2 and further comprising a tab bent at substantially 90° to the distal ends of the first and second legs.

4. The combination concrete weldment and precast concrete member of claim 3 wherein the top plate, side plate, first leg, second leg, and tabs are all integrally formed from a single piece of metal.

5. The combination concrete weldment and precast concrete member of claim 4 wherein the first leg is bent at an angle substantially 30° from the rear edge of the top surface.

6. The combination concrete weldment and precast concrete member of claim 5 wherein the second leg is bent at an angle substantially 60° from the bottom edge of the side plate.

7. The combination concrete weldment and precast concrete member of claim 1, wherein the top plate is mounted on the top face of the precast concrete member and the side plate is mounted on the front face of the precast concrete member.

* * * * *